United States Patent
Pratten et al.

(10) Patent No.: US 11,145,169 B2
(45) Date of Patent: Oct. 12, 2021

(54) SYSTEM AND METHOD FOR AUTOMATED DEPOSIT ITEM HANDLING

(71) Applicant: The Toronto-Dominion Bank, Toronto (CA)

(72) Inventors: A Warren Pratten, London (CA); Randall Walton Martin, Oakville (CA); Martin Albert Lozon, London (CA); Graham Allan Anderson, Guelph (CA); Ratnadeep Bhadra, Oakville (CA); James Kenneth Mccrae, Guelph (CA); Dino Paul D'Agostino, Richmond Hill (CA)

(73) Assignee: The Toronto-Dominion Bank, Toronto (CA)

( * ) Notice: Subject to any disclaimer, the term of this patent is extended or adjusted under 35 U.S.C. 154(b) by 17 days.

(21) Appl. No.: 16/129,060

(22) Filed: Sep. 12, 2018

(65) Prior Publication Data
US 2020/0082675 A1    Mar. 12, 2020

(51) Int. Cl.
*G07F 19/00*    (2006.01)
*G06Q 20/40*    (2012.01)
*G06Q 20/04*    (2012.01)

(52) U.S. Cl.
CPC ......... *G07F 19/202* (2013.01); *G06Q 20/042* (2013.01); *G06Q 20/4037* (2013.01); *G07F 19/206* (2013.01)

(58) Field of Classification Search
CPC ........ G07F 19/00; G07F 19/20; G07F 19/202; G06Q 20/042; G06Q 20/10; G06Q 20/1085; G06Q 40/00; G06Q 40/02
See application file for complete search history.

(56) References Cited

U.S. PATENT DOCUMENTS

| | | | |
|---|---|---|---|
| 8,099,361 B1 * | 1/2012 | Gupta | G06Q 20/10 705/39 |
| 8,121,950 B2 | 2/2012 | Hassanein et al. | |
| 8,332,329 B1 | 12/2012 | Thiele | |

(Continued)

OTHER PUBLICATIONS

Americu Credit Union: "How do I cash my check at your Check Cashing ATM?" retrieved from https://www.fuzecina.com/americu/ext/kb738-how-do-i-cash-my-check-at-your-check-cashing-atm, on Sep. 17, 2018.

*Primary Examiner* — Thien M Le
*Assistant Examiner* — April A Taylor
(74) *Attorney, Agent, or Firm* — Rowand LLP

(57) ABSTRACT

A computer system for automatically handling and releasing funds for deposit items has a memory storing instructions that, when executed by a processor, cause the system to receive an image of a cheque received and scanned by an automated teller machine (ATM) for deposit into a first account of an institution associated with the ATM. The scanned image of the cheque is analyzed to identify an institution and account on which that cheque is drawn. If that account has sufficient available funds to cover the cheque, then the first account is credited in the amount of the cheque without placing a hold on any of the credited amount and funds of the account on which the cheque is drawn are encumbered in that same amount. After crediting the first account, an indication is provided that the funds are available (e.g., to withdraw). Related methods and computer-readable media are also disclosed.

20 Claims, 8 Drawing Sheets

(56) References Cited

U.S. PATENT DOCUMENTS

| | | | |
|---|---|---|---|
| 8,504,476 B2 | 8/2013 | Richards | |
| 8,510,221 B2 | 8/2013 | Votaw et al. | |
| 9,378,490 B2 | 6/2016 | Slater et al. | |
| 10,423,938 B1* | 9/2019 | Gaeta | G06Q 20/4016 |
| 2002/0062286 A1* | 5/2002 | Tedesco | G06Q 20/04 |
| | | | 705/45 |
| 2002/0152164 A1 | 10/2002 | Dutta et al. | |
| 2009/0166406 A1 | 7/2009 | Pigg et al. | |
| 2010/0036767 A1* | 2/2010 | Sharoff | G06Q 20/10 |
| | | | 705/39 |
| 2013/0066777 A1* | 3/2013 | Richards | G06Q 40/02 |
| | | | 705/42 |
| 2014/0046842 A1* | 2/2014 | Irudayam | G07F 19/202 |
| | | | 705/43 |
| 2016/0358140 A1* | 12/2016 | Pigg | G06Q 20/1085 |
| 2016/0358141 A1* | 12/2016 | Pigg | G06Q 20/1085 |
| 2018/0285836 A1* | 10/2018 | Enobakhare | G06Q 20/042 |

* cited by examiner

SYSTEM AND METHOD FOR AUTOMATED DEPOSIT ITEM HANDLING

FIELD

The present application relates to handling deposit items in automated teller machines (ATMs) and, more particularly, to automatically analyzing and processing deposit items received by ATMs in real-time or near-real time.

BACKGROUND

Automated teller machines (ATMs) or automated banking machines (ABMs) allow certain banking activities to be performed without resort to a human teller. For example, withdrawal can be made with cash dispensed by the machine. In another example, deposits can be made with deposit items inserted into the machine.

In most existing ATMs, deposit items such as, for example cheques (also known as checks, both terms being used variously and interchangeably in this document) are inserted into the ATM using an envelope. At the same time, input is received by the ATM indicating a purported amount of the deposit. The account into which the items are deposited may then be credited with this purported amount, however the deposit is subject to later verification when the envelope is opened.

Typically, the deposit amount will be encumbered such as by placing a hold on at least some of the deposit amount in the account, thereby preventing withdrawal of all or most of the deposit amount to protect the financial institution from fraud or error in entering the purported amount. For example, local cheques may be held for a few days (for example, three) to allow for processing ("clearance").

Such a hold will be kept in place until the envelope contents are verified and, potentially, until the deposit clears—e.g., confirming a cheque will not be returned as drawn on an account without sufficient funds (a so-called not-sufficient funds or "NSF" cheque).

More recently, some so-called "envelope-free" ATMs allow deposit items to be received by an ATM without using an envelope. Such ATMs may include a scanner that captures an image of deposit items received by the ATM. This may facilitate technologies such as image-based check clearing (sometimes referred to as "cheque truncation") which can allow the handling of the physical cheque in the cheque clearing process to be replaced with electronic transfers of images. Notably, while scanning of deposit items such as by envelope-free ATMs may allow for faster clearing of deposit items, deposit items received by such ATMs are still typically subject to a "hold" preventing dispersal of deposited funds flowing therefrom for some period (usually measured in days) to allow for verification and/or clearing of the deposits.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
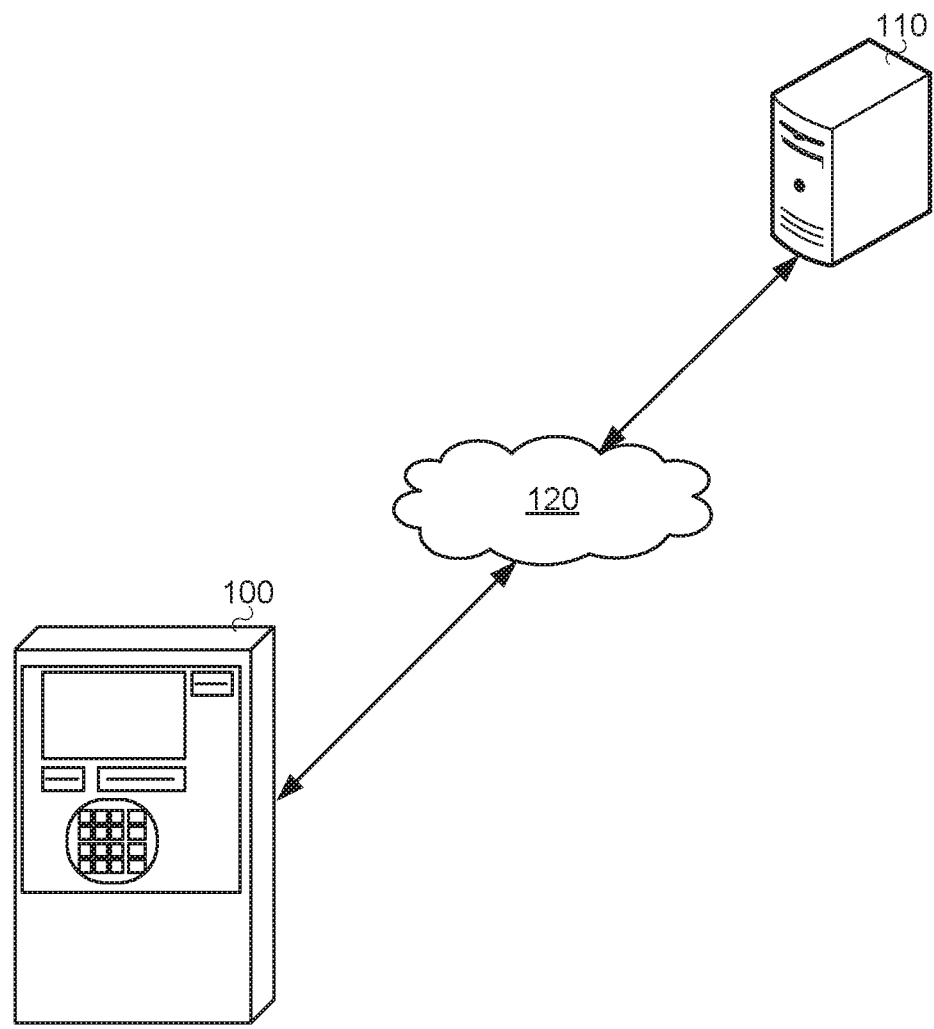
FIG. 1 is a schematic operation diagram illustrating an operating environment of an example embodiment.

According to the subject matter of the present application, there may be provided a computer-implemented method. The method may include receiving an image of a deposit item scanned by an automated teller machine, the deposit item having been received by the automated teller machine for deposit into a first account of a financial institution associated with the automated teller machine; analyzing the scanned image of the deposit item to identify a drawee institution for the deposit item; determining that the drawee institution is the financial institution associated with the automated teller machine; analyzing the scanned image of the deposit item to identify a drawer account on which the deposit item is drawn at the financial institution; confirming that the drawer account has sufficient available funds to cover an amount of the deposit item; and upon confirming that the drawer account has sufficient funds to cover the amount of the deposit item, crediting the first account in the amount of the deposit item without placing a hold on any of funds in the first account and encumbering funds of the drawer account in the amount of the deposit item; and after crediting the first account in the amount of the deposit item, sending an indication to the automated teller machine that the amount of the deposit item is now available in the first account.

In this way, funds of a deposit item (e.g., a cheque) drawn on the same financial institution into which it is being deposited may be cleared in real-time or near real-time in the course of processing a deposit item received by an ATM as a part of a deposit. Conveniently, such a cleared deposit may be available for immediate withdrawal—i.e., in the context of the same ATM session as the deposit without waiting for processing.

In some implementations, the automated teller machine may be configured to display a user interface indicating that the amount of the deposit item is now available in the first account responsive to the indication.

In some implementations, the method may also include receiving an image of a second deposit item scanned by the automated teller machine, the second deposit item having been received by the automated teller machine for deposit into the first account; analyzing the scanned image of the second deposit item to identify a drawee institution for the second deposit item; determining that the drawee institution for the second deposit item is the financial institution associated with the automated teller machine; analyzing the scanned image of the second deposit item to identify a drawer account on which the second deposit item is drawn at the financial institution; confirming that the drawer account on which the second deposit item is drawn does not have sufficient available funds to cover an amount of the second deposit item; upon confirming that the drawer account on which the second deposit item is drawn does not have sufficient funds to cover the amount of the second deposit item, crediting the first account in the amount of the second deposit item and placing a hold on funds in the first account in the amount of the second deposit item; and sending an indication to the automated teller machine that the amount of the second deposit item is not yet available in the first account.

The deposit item may include a line of magnetic ink character recognition (MICR) characters.

In some implementations, analyzing the scanned image of the deposit item to identify the drawee institution may include using optical character recognition to recognize characters of at least a portion of the MICR line; and identifying the drawee institution based on the recognized characters.

In some implementations, analyzing the scanned image of the deposit item to identify the drawer account on which the deposit item is drawn at the financial institution may include identifying the drawer account based on the recognized characters of at least a portion of the MICR line.

In some implementations, prior to confirming that the drawer account has sufficient available funds to cover an amount of the deposit item, it may be determined that the amount of the deposit item is less than a limit. For example, such a limit may be determined based on the first account.

According to the subject matter of the present application, there may be provided a computer system configured to perform the above-described method. Such a computer system may include a processor, a communications module, and a memory. The communications module may be coupled to the processor. The memory may be coupled to the processor. The memory may be coupled to the processor. The memory may store instructions that, when executed by the computer system, cause the computer system to perform the above described method.

In a particular example, there may be provided a computer system including a processor; a communications module coupled to the processor; and a memory coupled to the processor storing instructions that, when executed by the processor, cause the computer system to: receive, using the communications module, an image of a deposit item scanned by an automated teller machine, the deposit item having been received by the automated teller machine for deposit into a first account of a financial institution associated with the automated teller machine; analyze the scanned image of the deposit item to identify a drawee institution for the deposit item; determine that the drawee institution is the financial institution associated with the automated teller machine; analyze the scanned image of the deposit item to identify a drawer account on which the deposit item is drawn at the financial institution; confirm that the drawer account has sufficient available funds to cover an amount of the deposit item; upon confirming that the drawer account has sufficient funds to cover the amount of the deposit item, credit the first account in the amount of the deposit item without placing a hold on any of the credited amount and encumber funds of the drawer account in the amount of the deposit item; and after crediting the first account in the amount of the deposit item, send an indication to the automated teller machine that the amount of the deposit item is now available in the first account.

According to the subject matter of the present application, there may be provided a non-transitory computer-readable storage medium storing instructions that, when executed by a processor of a computer system cause the computer system to perform the above-described method.

In a particular example, there may be provided a non-transitory computer-readable storage medium storing instructions that, when executed by a processor of a computer system cause the computer system to: receive an image of a deposit item scanned by an automated teller machine, the deposit item having been received by the automated teller machine for deposit into a first account of a financial institution associated with the automated teller machine; analyze the scanned image of the deposit item to identify a drawee institution for the deposit item; determine that the drawee institution is the financial institution associated with the automated teller machine; analyze the scanned image of the deposit item to identify a drawer account on which the deposit item is drawn at the financial institution; confirm that the drawer account has sufficient available funds to cover an amount of the deposit item; upon confirming that the drawer account has sufficient funds to cover the amount of the deposit item, credit the first account in the amount of the deposit item without placing a hold on any of the credited amount and encumber funds of the drawer account in the amount of the deposit item; and after crediting the first account in the amount of the deposit item, send an indication to the automated teller machine that the amount of the deposit item is now available in the first account.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 is a schematic operation diagram illustrating an operating environment of an example embodiment.

As illustrated, an automated teller machine 100 and a back-office server system 110 communicate via a computer network 120.

The automated teller machine 100 and the back-office server system 110 may be in geographically disparate locations. Put differently, the automated teller machine 100 may be remote from the back-office server system 110.

As further explained below, the automated teller machine 100 and the back-office server system 110 are computer systems.

The automated teller machine 100 is adapted to provide access to banking services such as, for example, withdrawals and deposits. As further explained below, the automated teller machine 100 is configured to scan (e.g., capture a digital image of) at least some of the deposit items it receives. As such, the automated teller machine 100 may be an "envelope-free" automated teller machine.

The back-office server system 110 is a server that provides one or more back-office services to the financial institution including, for example, maintenance of accounts, payment processing, fraud detection and the like. The back-office server system 110 may, for example, be a mainframe computer, a minicomputer, or the like. In some embodiments, the back-office server system 110 may be formed of or may include one or more computing devices. For example, the back-office server system 110 may include and/or may communicate with multiple computing devices such as, for example, database servers, compute servers, and the like. Multiple computing devices such as these may be in communication using a computer network. For example, such computing devices may communicate using a local-area network (LAN). In some embodiments, the back-office server system 110 may include multiple computing devices organized in a tiered arrangement. For example, the back-office server system 110 may include middle tier and back-end computing devices. In some embodiments, the back-office server system 110 may be a cluster formed of a plurality of interoperating computing devices.

The computer network 120 is a computer network. In some embodiments, the computer network 120 may be an internetwork such as may be formed of one or more interconnected computer networks. For example, the computer network 120 may be or may include an Ethernet network, an asynchronous transfer mode (ATM) network, a wireless network, or the like. Additionally or alternatively, one or more devices may communicate with the computer network by way of a plain-old telephone service (POTS) line such as using a modem. In a particular example, the automated teller machine 100 may communicate with the back-office server system 110, directly or indirectly, by way of a POTS line.

Figure 2:
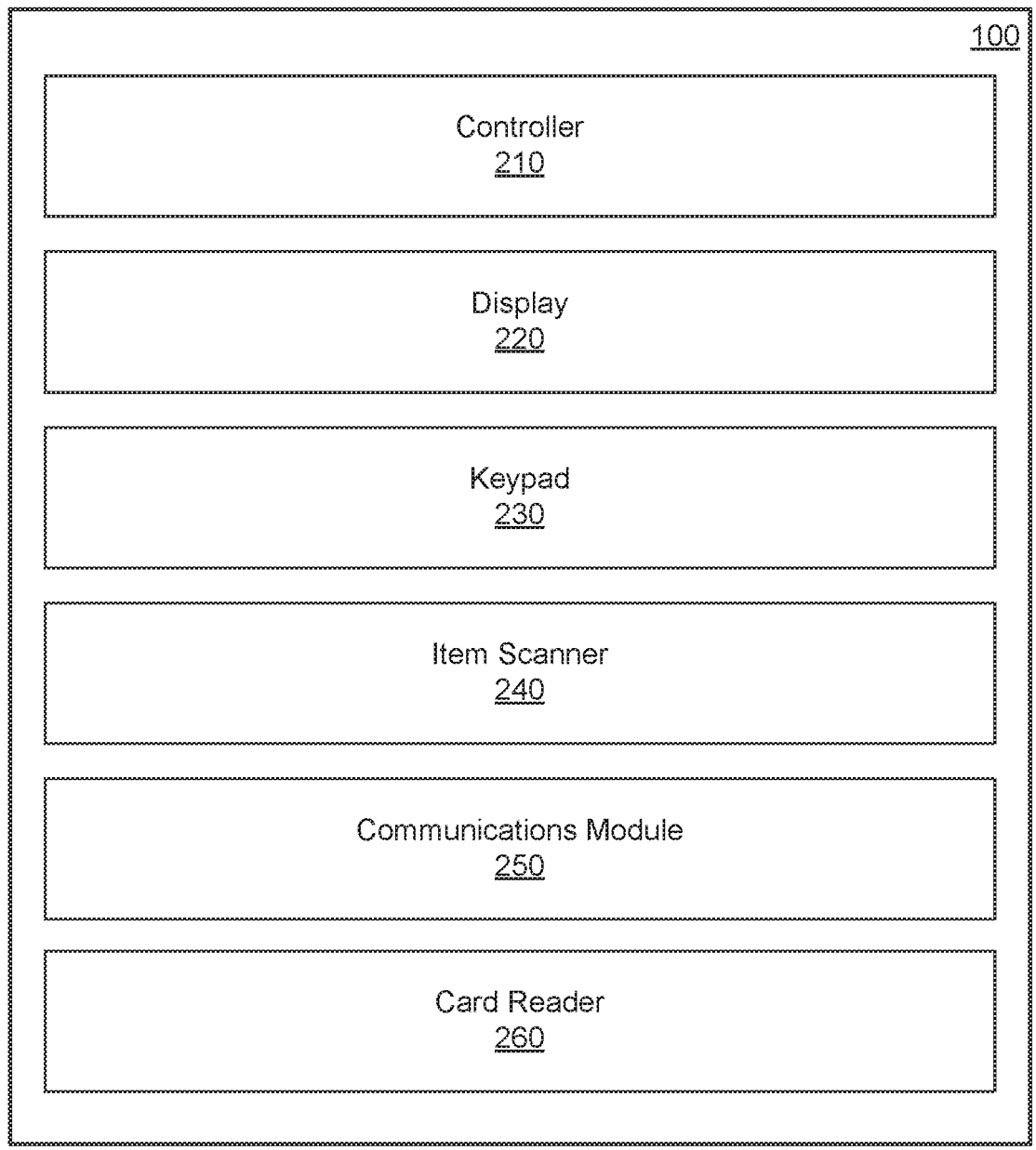
FIG. 2 is a logical block diagram of an example automated teller machine.

Example components of the automated teller machine 100 will now be described with reference to FIG. 2.

As illustrated, the automated teller machine may include a controller 210, a display 220, a keypad 230, an item scanner 240, a communications module 250 and a card reader 260.

As further described below, the controller 210 is a computing device. For example, the controller 210 may include a processor that executes instructions retrieved from a computer-readable medium thereby causing the automated teller machine 100 to perform operations for providing access to banking services.

The display 220 is for presenting information such as to a user of the automated teller machine 100. The display 220 may present information under control of the controller 210. The display 220 may for example, be a liquid-crystal display (LCD), a cathode-ray tube (CRT), or the like.

The keypad 230 is an input device allowing input to be provided to the automated teller machine 100. Input received via the keypad 230 may be conveyed to the controller 210. Notably, the keypad 230 may be used by a user to provide a personal identification number (PIN) to the automated teller machine 100 as a part of authenticating to the automated teller machine 100.

The item scanner 240 is adapted to scan some or all of the deposit items received by the automated teller machine 100. For example, the item scanner 240 may scan deposit items (such as, for example, negotiable instruments like cheques, money orders, bank drafts, warrants of payment, etc.) as they are inserted into the automated teller machine 100. The item scanner 240 may be a colour, black and white, or a greyscale scanner. In some cases, the item scanner 240 may, additionally or alternatively, be an ultraviolet scanner. An ultra-violet scanner may, for example, allow security features of some deposit items to be identified such as, for example, for counterfeit detection. The item scanner 240 may use one or more of a variety of scanning technologies. For example, the item scanner 240 may be or may employ a contact image sensor (CIS), a charge-coupled device (CCD), or the like.

The communications module 250 allows the automated teller machine 100 to communicate with other computing devices and/or various communications networks such as, for example, the computer network 120. In other words, the communications module 250 may allow the automated teller machine 100 to send or receive communications signals. Communications signals may be sent or received according to one or more protocols or according to one or more standards. For example, the communications module 250 may allow the automated teller machine 100 to communicate via an Ethernet network, an ATM network, a telephone network, and/or via cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally or alternatively, the communications module 250 may allow the automated teller machine 100 to communicate using near-field communication (NFC), via Wi-Fi™, using Bluetooth™ or via some combination of one or more networks or protocols.

The card reader 260 allows data to be read from a card such as, for example, a common ISO-sized ATM or check card. For example, the card reader 260 may allow data to be read from magnetic stripe cards and/or chip cards. In some embodiments, the card reader 260 may require a card to be swiped through it to be read (a so-called "swipe reader") and/or it may allow a card to be inserted into it for reading (a so-called "dip reader"). In some embodiments, the card reader 260 may be adapted to allow inserted cards to be retained by the automated teller machine 100 indefinitely (such as if fraud is suspected) and/or for the period of a session.

Figure 3:
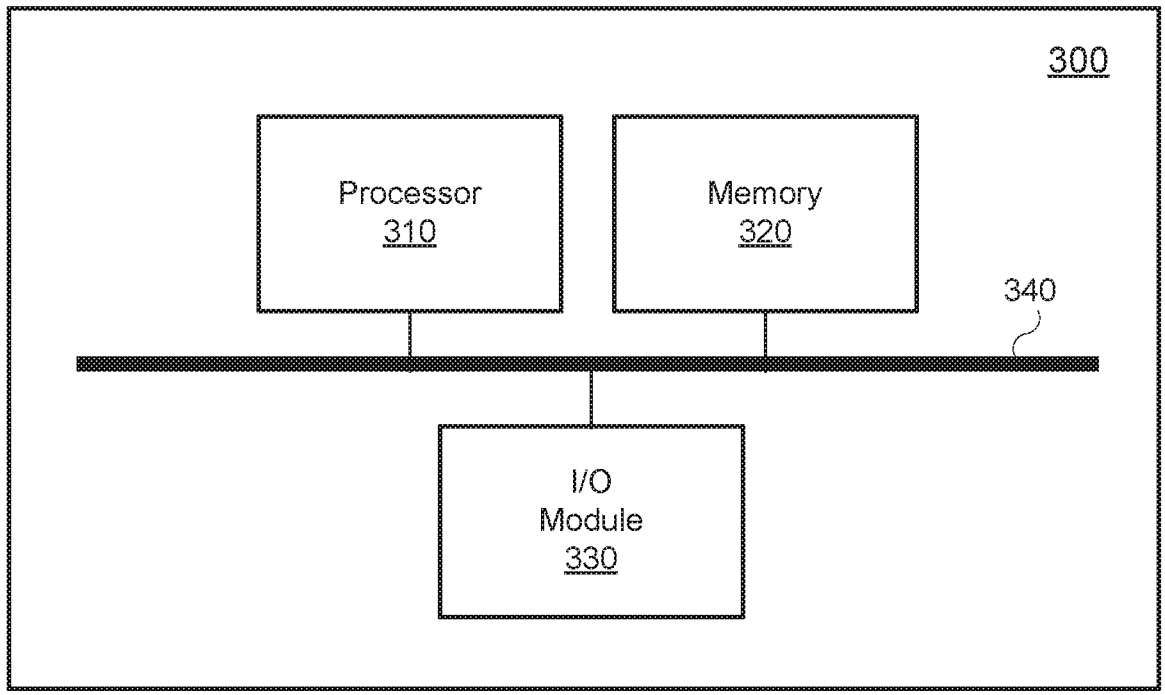
FIG. 3 is a high-level operation diagram of an example computing device.

FIG. 3 is a high-level operation diagram of an example computing device 300. In some embodiments, the example computing device 300 may be exemplary of one or more of the controller 210 (FIG. 2) and the back-office server system 110 (FIG. 1). As will be discussed in greater detail below, each of the automated teller machine 100 (FIG. 1) (and, potentially, the controller 210 in particular) and the back-office server system 110 includes software that adapts it to perform a particular function. More particularly, software of each of the automated teller machine 100 and the back-office server system 110 cooperates, with communication between the automated teller machine 100 and the back-office server system 110 in order to automatically analyze and process deposit items in real-time or near-real time as they are received by the automated teller machine 100.

The example computing device 300 includes a variety of modules. For example, as illustrated, the example computing device 300 may include a processor 310, a memory 320, and an input/output (I/O) module 330. As illustrated, the foregoing example modules of the example computing device 300 are in communication over a bus 340.

The processor 310 is a hardware processor. The processor 310 may, for example, be one or more ARM, Intel x86, PowerPC processors or the like.

The memory 320 allows data to be stored and retrieved. The memory 320 may include, for example, random access memory, read-only memory, and persistent storage. Persistent storage may be, for example, flash memory, a solid-state drive or the like. Read-only memory and persistent storage are each a non-transitory computer-readable storage medium. A computer-readable medium may be organized using a file system such as may be administered by an operating system governing overall operation of the example computing device 300.

The I/O module 330 allows the example computing device 300 to interact with devices such as, for example, peripherals to send and receive data. The I/O module 330 may, for example, allow the example computing device 300 to interface with input devices such as, for example, keypads, keyboards, pointing devices, and the like. In another example, the I/O module 330 may, for example, allow the example computing device 300 to interface with output devices such as, for example, displays, printers, and the like. In a particular example, where the example computing device 300 forms a part of the automated teller machine 100 (FIG. 1) such as, for example, if the example computing device 300 is or forms a part of the controller 210 (FIG. 2) of the automated teller machine 100, the I/O module 330 may allow the example computing device 300 to interface with one or more of the display 220, the keypad 230, the item scanner 240, the communications module 250, and/or the card reader 260.

Software comprising instructions is executed by the processor 310 from a computer-readable medium. For example, software may be loaded into random-access memory from persistent storage of the memory 320. Additionally or alternatively, instructions may be executed by the processor 310 directly from read-only memory of the memory 320.

Figure 4:
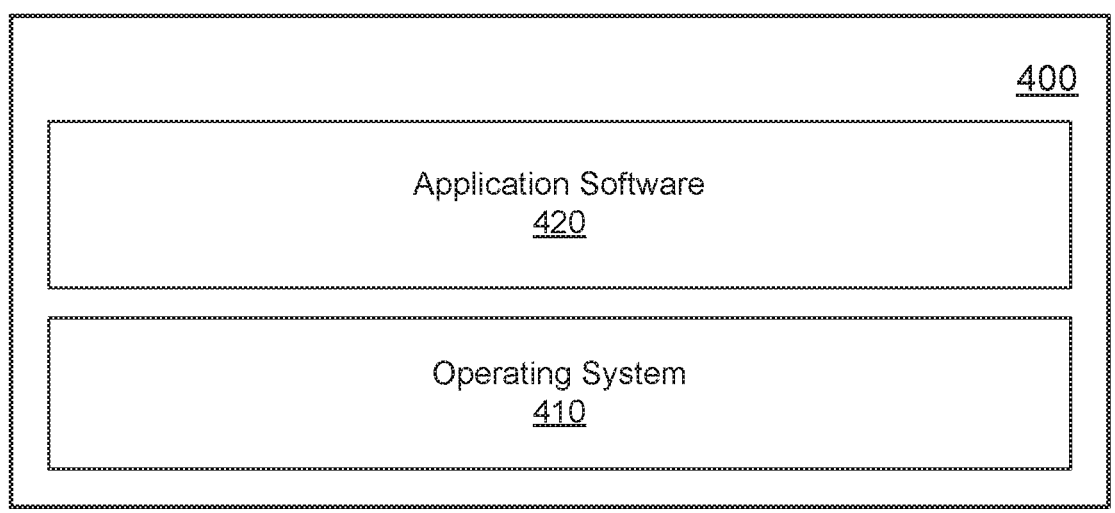
FIG. 4 depicts an example simplified software organization of the example computing device of FIG. 3.

FIG. 4 depicts a simplified organization of software components stored in the memory 320 of the example computing device 300. As illustrated these software components include an operating system 400 and an application 410.

The operating system 400 is software. The operating system 400 allows the application 410 to access the processor 310, the memory 320, and the I/O module 330. The operating system 400 may be, for example, UNIX™, Linux™, Microsoft™ Windows™, Apple OSX™ or the like.

The application software 420 adapts the example computing device 300, in combination with the operating system 400, to operate as a device performing a particular function. For example, the application software 420 may cooperate with the operating system 400 to adapt a suitable embodiment of the example computing device 300 to operate as the controller 210 (FIG. 2) of the automated teller machine 100 (FIG. 1) or as the back-office server system 110 (FIG. 1).

Operations performed by the automated teller machine 100 and the back-office server system 110 will be described below with reference to FIGS. 5-7.

Figure 5:
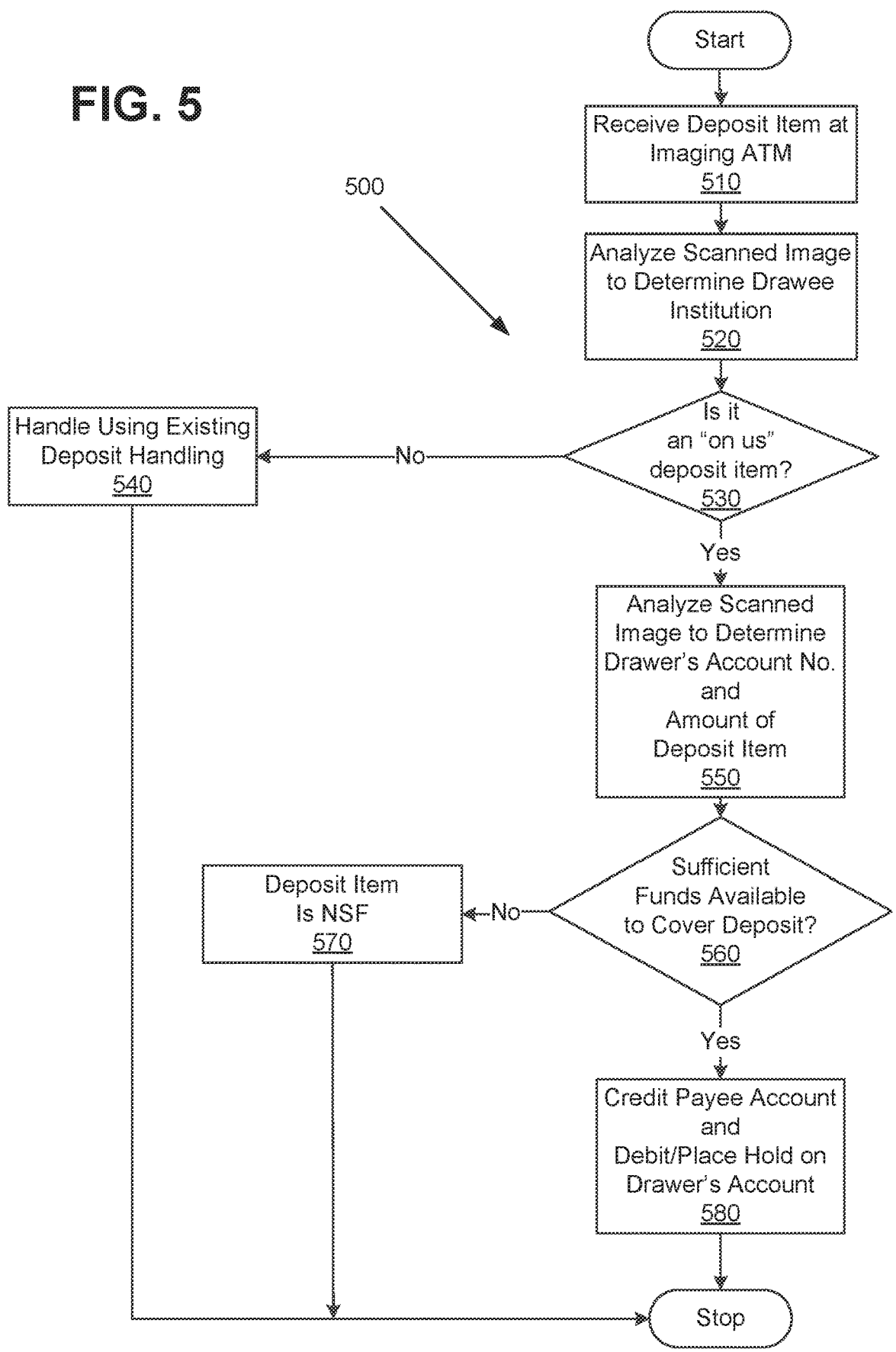
FIG. 5 provides a flowchart depicting example operations performed in automatically handling a deposit item.

FIG. 5 provides a flowchart 500 depicting example operations performed in automatically handling a deposit item. Operations 510 and onward are performed by one or more processors of one or more computing device, such as, for example, the processor 310 (FIG. 3) of one or more suitably configured instances of the example computing device 300 (FIG. 3), executing software such as, for example, a suitable instance of the application 410 (FIG. 4).

At the operation 510, a deposit item is received by the automated teller machine 100 (FIG. 1) for deposit into an account associated with the automated teller machine 100. The deposit item may, for example, be a cheque (check). The deposit item is scanned by the automated teller machine 100 to provide an electronic image (e.g., a bitmap) representing the deposit item. The deposit item may be scanned by the item scanner 240 (FIG. 2).

After scanning, the captured image of the deposit item (for example, a scanned image of a received cheque) may be received by the controller 210. Additionally or alternatively, the scanned image of the deposit item, may be transmitted to and received by another computing device such as, for example, the back-office server system 110.

Following the operation 510, at an operation 520, the scanned image of the deposit item is analyzed to determine the institution (e.g., a bank or credit union) on which it is drawn. Put differently, information encoded on the deposit item is extracted from the deposit item and used to determine the drawee institution.

The institution on which a deposit item is drawn can be determined from the face of the document. As such, information allowing the institution on which the deposit item is drawn may also be available in the scanned image of the deposit item. In some cases, that information may identify the institution directly (e.g., by way of a name or a unique identifying number). In other cases, that information may allow a look-up to be performed in order to identifying the institution.

Notably, in each case, how to determine the institution on which a given deposit item is drawn will depend on factors such as, for example, the type of deposit item (e.g., is it a cheque), where the deposit item originated (e.g., is it a Canadian cheque or an American check), etc.

Figure 6:
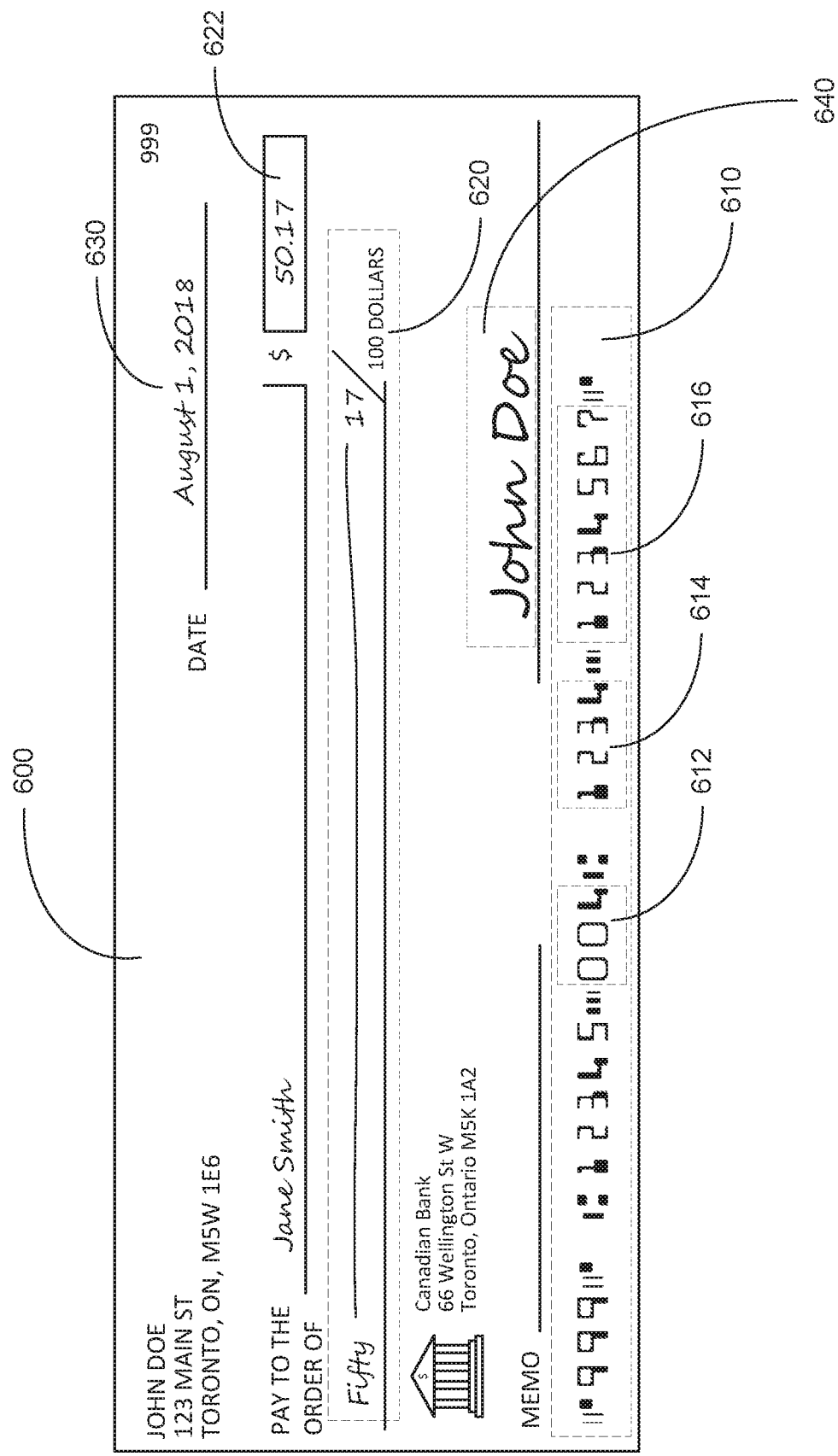
FIG. 6 is a simplified illustration showing an example Canadian cheque as may be automatically handled as a deposit item according to the subject matter of the present application.
Figure 7:
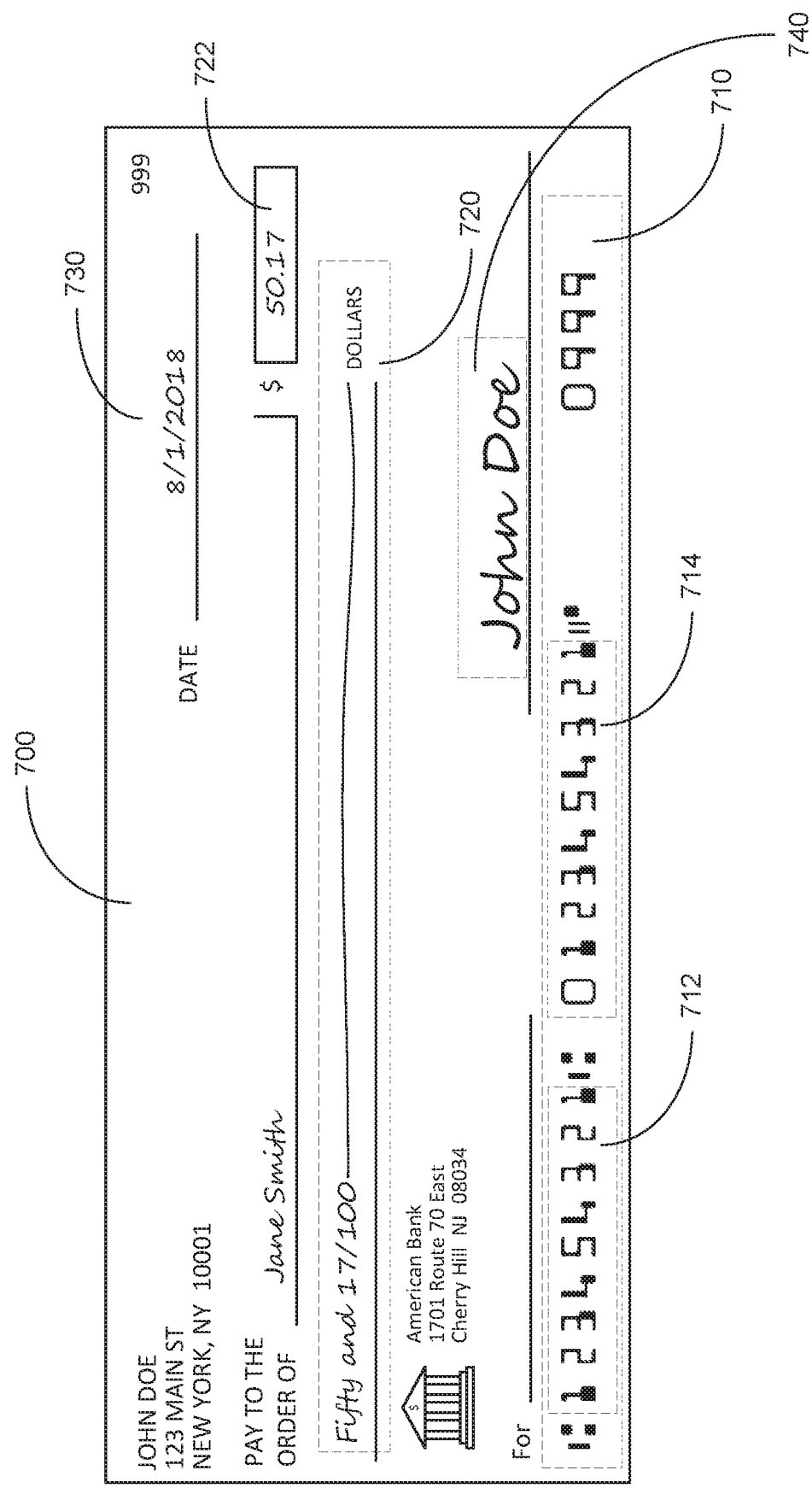
FIG. 7 is a simplified illustration showing an example American check as may be automatically handled as a deposit item according to the subject matter of the present application.

Examples of how the institution on which a deposit item is drawn may be determined at the operation 520 will now be provided with reference to FIGS. 6 and 7.

FIG. 6 is a simplified illustration showing an example Canadian cheque 600. As illustrated, the example Canadian cheque 600 includes a variety of elements. These elements are standardized according to standards published by Payments Canada (formerly known as the Canadian Payments Association) such as, for example, Standard 006 entitled "Specifications for MICR-Encoded Payment Items", 2017 (available, for example, from the organization's website, www.payments.ca), the contents of which are herein incorporated by reference in their entirety.

As illustrated, the example Canadian cheque 600 includes a variety of elements including a line of magnetic ink character recognition (MICR) characters, MICR line 610, a legal amount 620, a convenience amount 622, a date 630, and a signature 640.

The MICR line 610 provides information about the example Canadian cheque 600 in machine-readable format. In particular, the characters of the MICR line 610 may be recognized using a magnetic or an optical scanner. The MICR line 610 provides information in a defined format. In particular, the characters of the MICR line 610 are divided into fields, each provide particular information about the example Canadian cheque 600.

As illustrated, the characters of the MICR line 610 use a special font known as MICR E-13B. In addition to numerals, the MICR E-13B font includes symbols that are used to denote field boundaries. For example, in a segment of the MICR line 610 between two symbols known as "transit" symbols and following a "dash" symbol, a field providing an institution code 612 is provided. The institution code 612 is a three-digit code identifying the financial institution on which the example Canadian cheque 600 is drawn (the "drawee institution"). Thus, in order to analyze a scanned image of a Canadian cheque such, as for example, the example Canadian cheque 600 to identify the drawee institution, the MICR line 610 of the cheque may be identified and then interpreted in order to extract the institution code. For example, optical character recognition (OCR) techniques may be applied to the scanned image of the Canadian cheque in order to read the characters of the MICR line 610.

Additionally or alternatively, it may be that the MICR line 610 is interpreted magnetically rather than optically. For example, an automated teller machine may include a MICR reader that magnetically interprets the MICR line 610. In a particular example, it could be that an automated teller machine includes a MICR reader that scans MICR lines of deposit items as they pass through the scan path of an item scanner.

As mentioned above, the example Canadian cheque 600 includes two amount fields. The convenience amount 622 provides an amount of the example Canadian cheque ($50.17) using numerals. The legal amount 620 provides the amount of the example Canadian cheque 600 using words. As further described below, one or both of the convenience amount 622 and the legal amount 620 may be interpreted in analyzing the scanned image of a Canadian cheque in order to identify the amount of the cheque.

The example Canadian cheque 600 also includes other fields that allow the account on which the cheque is drawn at the drawee institution (the "drawer account"). In particular, following the second "transit" symbol, a designation number 614 is provided. Then, after the designation number 614 and following a "dash" symbol, an account number 616 is provided. The account number 616 is terminated by another symbol, the "on-us" symbol. Together the designation number 614 and the account number 616 identify an account at the financial institution represented by the institution code 612.

The example Canadian cheque 600 also includes other fields such as, for example, addresses of the drawee and the drawer, a memo line, the date 630, and the signature 640 mentioned above. These provide additional information that may allow the cheque to be understood or interpreted. For example, the date 630 may be considered to determine whether a cheque is post-dated (and thus, potentially, not yet eligible for deposit) or stale-dated (too old to pay). In another example, the signature 640 may be considered or verified to consider whether the cheque is valid (e.g., has it been signed by the payor).

FIG. 7 is a simplified illustration showing an example American check 700. As illustrated, the example American check 700 includes a variety of elements. These elements are standardized according to various standards documents produced by the Accredited Standards Committee X9, Incorporation, and registered with the American National Standards Institute (ANSI) including ASC X9 TR2, "Understanding, Designing and Producing Checks"; ASC X9 TR 6, "Guide to Quality MICR Printing and Evaluation", ASC X9 TR 8, "Check Security"; ASC X9 TR 33, "Check Image Quality Assurance—Standards and Processes"; and ASC X9 TR 100-2013 "Organization of Check-related Payments Standards", the contents of each which is herein incorporated by reference in its entirety.

As illustrated, the example American check 700 includes a variety of elements including a line of magnetic ink character recognition (MICR) characters, MICR line 710, a legal amount 720, a convenience amount 722, a date 730, and a signature 740.

The MICR line 710 provides information about the example American check 700 in machine-readable format and is divided into fields akin to the MICR line 610 (FIG. 6) of the example Canadian cheque 600. However, as further described below, the format of the fields in the MICR line 710 is different from that of the MICR line 610 because of differences between American check standards and Canadian cheque standards.

The MICR line 710 includes fields including a routing number 712 (found between a pair of "transit symbols") that is followed by an account number 714 (which is terminated by an "on-us" symbol).

The routing number 712 provides a nine-digit ABA routing number (ABA RTN). The routing number 712 provides information related to routing of checks in the US Federal Reserve system including allowing the institution on which the example American check 700 is drawn (the "drawee institution") to be identified.

The account number 714 identifies an account at the financial institution corresponding to the routing number 712.

As mentioned above, the example American check 700 also includes two amount fields. The convenience amount 722 provides an amount of the example American check ($50.17) using numerals. The legal amount 720 provides the amount of the example American check 700 using words. In other words, the convenience amount 722 and the legal amount 720 are similar to the convenience amount 622 (FIG. 6) and the legal amount 620 of the example Canadian cheque 600, but differ somewhat in format due to national standards and conventions. As further described below, one or both of the convenience amount 722 and the legal amount 720 may be interpreted in analyzing the scanned image of an American check in order to identify the amount of the check.

The example American check 700 also includes other fields such as, for example, addresses of the drawee and the drawer, a "for" line (also known as a memo line), the date 730, and the signature 740 mentioned above. These provide additional information that may allow the check to be understood or interpreted. For example, the date 730 may be considered to determine whether a check is post-dated or stale-dated. In another example, the signature 740 may be considered or verified to consider whether the check is valid (e.g., has it been signed by the payor).

The above description is by way of example but serves to illustrate how, for example, by using techniques such as, for example, optical character recognition, to recognize characters of at least a portion of the MICR line of a cheque, the information such as the drawee institution and/or the drawer account may be identified based on the recognized characters. Other deposit items may be analyzed in similar manners. For example, a similar analysis may be applied to cheques from other countries' banking systems. Notably, in some cases the exact particular of how those cheques will be analyzed will vary, informed by national cheque standards. For example, in some countries different methods may be used to encode drawee institution and account information on cheques. In a particular example, fonts other than MICR E-13B such as, for example, CMC-7, may be employed in encoding information.

Referring back to FIG. 5, following determination of the drawee institution at the operation 520, at the operation 530 is it determined whether the drawee institution is the financial institution associated with the account into which the deposit is being made (i.e., the institution associated with the automated teller machine 100). If not, the next operation is an operation 540. If, however, the drawee institution of the deposit item is the institution associated with the automated teller machine 100 (meaning the deposit item is what is sometimes called an "on us" deposit item, such as, for example, an "on us" cheque), then the next operation is an operation 550.

At the operation 540, processing of the deposit item is performed according to conventional deposit handling. For example, a provisional deposit may be made into the payee's account but with a hold put on some or all of the deposit amount to allow for verification and clearing.

By contrast, beginning at the operation 550, special handling is provided for "on us" deposit items. In particular, as further described below, "on us" deposit items will be further analyzed and processed in real-time or near-real time. Conveniently, as further explained below, such real time processing may allow the encumbrance of funds to be avoided and thereby may allow funds flowing from "on us" deposit items to be used for other purposes (e.g., withdrawal, transfer, payments, etc.) immediately or nearly immediately. More particular, the subject matter of the present application may allow such funds flowing from "on us" deposit items to be used for other purposes in a next transaction including, potentially, in the same session (e.g., without waiting) at the ATM.

At the operation 550, the scanned image of the deposit item is further analyzed to determine the account number of the drawer and the amount of the cheque. For example, in the case where the deposit item is a Canadian cheque such as the example Canadian cheque 600 (FIG. 6), the MICR line of scanned image of the cheque may be analyzed to identify a drawer account on which the check is drawn at the financial institution—e.g., based on the designation number 614 and the account number 616. The amount of the cheque may also be extracted from the scanned image of the cheque such as, for example, by applying OCR or other image processing techniques to suitable portions of the cheque— e.g., one or more of the legal amount 620 and the convenience amount 622. In another example, where the deposit item is an American check such as the example American check 700 (FIG. 7), the MICR line of scanned image of the cheque may be analyzed to identify a drawer account on which the check is drawn at the financial institution—e.g., based on the account number 714. The amount of the cheque may also be extracted from the scanned image of the cheque such as, for example, by applying OCR or other image processing techniques to one or more of the legal amount 720 and the convenience amount 722.

Following the operation 550, control flow advances to an operation 560.

At the operation 560, it is determined whether the drawer account has sufficient funds to cover the amount of the deposit item. For example, a drawer account may have sufficient funds to cover the amount of a deposit item if it has available funds of at least that amount and/or is linked to another account or has overdraft protection sufficient to cover the amount of the deposit item either alone or in combination with available funds. Notably, because the drawer account is with the same financial institution as is associated with the automated teller machine 100, the back-office server system 110 or similar may access information related to the drawer account to determine available funds.

If it is confirmed that the drawer account has sufficient funds to cover the amount of the deposit item, an operation 580 is next.

Alternatively, if is instead confirmed that the drawer account on which that deposit item is drawn does not have sufficient funds to cover the amount of the deposit item, an operation 570 is next.

Notably, the operation 570 is reached if the deposit item if there are insufficient funds to cover the deposit item (e.g., it is "not sufficient funds" (NSF)).

NSF items may be handled in a variety of manners, typically in accordance with policies of the institution.

For example, it may be that the deposit item will be immediately returned with an indication that it is NSF.

In another example, the item may be held for re-presentment against the drawee account at a later point. In this or other cases, a provisional credit may be applied to the account into which the deposit item is being credited such as, for example, by crediting that account in the amount of the deposit items while also placing a hold on funds in that account in the amount of the deposit item, thereby encumbering those funds.

Since funds may not be made available if an NSF deposit item is received, the automated teller machine 100 may display a user interface indicating that the amount of the deposit item is not available. For example, where some of the processing at the operation 570 is performed at a system remote from the automated teller machine 100 (e.g., at the back-office server system 110), an indication may be sent to the automated teller machine that the amount of the deposit item is not yet available in the account. The automated teller machine 100 may then, in turn, be configured to display a user interface indicating that the amount of the deposit item is not yet available in the account responsive to the indication.

In contrast to the NSF case, if there are sufficient funds in the drawer account to cover the amount of the deposit item then those funds may be made available in the account into which the deposit item is being deposited at the operation 580.

In particular, at the operation 580, the account into which the deposit is being made may be credited in the amount of the deposit item without placing a hold on any of the funds in that account. Further, funds of the drawer account sufficient to cover the amount of the cheque are encumbered. For example, the drawer account may be debited in the amount of the cheque. Alternatively, a hold may be placed on funds in the drawer account sufficient to cover the amount of the cheque, with the actual debit to be performed later.

Notably, the confirming of sufficient funds at the operation 560, the crediting of the account into which the deposit item is being deposited at the operation 580, and the encumbering of funds of the drawer account in the amount of the deposit item at the operation 580 may, in some embodiments, be performed atomically to avoid a race condition whereby a concurrent withdrawal from the drawer account could lead to an uncovered overdraft in the drawer account and available funds added to the account into which the deposit item is being deposited—i.e., overlooking that the deposit item became NSF.

In any event, at the operation 580 since funds will now be available stemming from the deposit, the automated teller machine 100 may display a user interface indicating that the amount of the deposit item is now available in the account into which it was deposited. For example, such a user interface may indicate that those funds have not been held and/or that the amount of the deposit item is available for immediate withdrawal or transfer. Notably, where some of the processing at the operation 580 is performed at a system remote from the automated teller machine 100 (e.g., at the back-office server system 110), an indication may be sent to the automated teller machine that the amount of the deposit item is now available in the account. The automated teller machine 100 may then, in turn, be configured to display a user interface indicating that the amount of the deposit item is now available in the account responsive to the indication.

The method and process described in the flowchart 500 is capable of variation. A non-exhaustive sampling of possible variations will now be provided.

In a first example of possible variations, even if there are sufficient funds in the drawer account to cover a deposit item, it may be undesirable to fulfill the entire amount of a deposit item from the drawer account immediately. For example, a limit may be applied to prevent making some or all of the deposit amount of a deposit item with an amount above a limit available immediately. High-amount deposit items, may then, for example, be handled using conventional deposit handling—i.e., without processing the deposit item so as to make funds flowing therefrom available in real-time or near-time.

In a particular example, it may be that, prior to confirming that the drawer account has sufficient available funds to cover an amount of the deposit item, it may be determined whether the amount of the cheque is less than a limit. If so, control flow may proceed to another operation (not shown) such as, for example, to an operation akin to the operation 540.

Such a limit may be determined in a variety of fashions. For example, the limit may be determined based on the account that the deposit item has been received for deposit into. For example, the limit may be based on a balance of that account. Additionally or alternatively, the limit may be based on other deposits into that account. For example, it may be that only a limited amount of "on us" deposit items and/or a limited total value of such items may be permitted for a particular account or customer within a specified time interval (e.g., a maximum weekly limit).

In another example of possible variations, the analysis of the scanned image of the deposit item at the operations 520 and 550 may be performed by automated teller machine 100 such as, for example, by the controller 210. Alternatively, the analysis may be performed by another computer system such as, for example, the back-office server system 110. Alternatively again, the analysis may be performed by more than one computer system in co-operation. For example, the automated teller machine 100 may perform one portion of the analysis while the back-office server system 110 may perform another portion of the analysis. In a particular example, part of the operation 520 and/or the operation 550 (e.g., identifying and extracting pixels of a MICR line) may be performed by the automated teller machine 100 while another part of that operation (e.g., optical character recognition of the MICR line) may be performed by the back-office server system 110. In some embodiments, the operations 520, 550 may be performed with different divisions of work. For example, one of the operations 520, 550 may be performed entirely by one computing device while the other of the operations 520, 550 may be performed entirely by another computer device or by computing devices in co-operation.

In yet another example of possible variations, other features of the scanned image of the deposit item may be analyzed during processing. For example, if the deposit item bears a date (such as, for example, the date 630 (FIG. 6) of the example Canadian cheque 600 or the date 730 (FIG. 7) of the example American check 700), then it may be verified as a part of processing the deposit item. For example, it may be that a post-dated or stale-dated deposit item will not be eligible for funds release in real-time or near-real time and may, for example, be handled according conventional deposit item handling such as, for example, by way of an operation akin to the operation 540. In another example, it may be that post-dated or stale-dated deposit items will be simply rejected by the automated teller machine 100 as unacceptable for deposit. Additionally or alternatively, if the deposit item is of a sort that it is expected to bear the signature of a payor (such as, for example, the signature 740 (FIG. 6) of the example Canadian cheque 600 or the signature 740 (FIG. 7) of the example American check 700), the image of the deposit item may be analyzed to verify the signature. At the most basic, the image of the deposit item may be analyzed to verify that it includes something in the area where a signature was expected—i.e., an apparent signature. In some cases, the portion of the image in such a signature area may be inspected to determine whether it is consistent with the apparent signature having been applied with ink. Additionally or alternatively, the portion of the image in the signature area may be compared to an exemplar image of the signature of/an authorized signor for the payor (i.e., does the apparent signature match the exemplar signature). Notably, where the deposit item is an "on us" deposit item, such an exemplar signature may be on hand for the payor such as, for example, by way of a signature card associated with the drawee account.

In a yet further example of possible variations, it may be that funds are withdrawn from the drawer account but are not deposited immediately into the payee's account. Instead, such funds may be held for some hold period in an escrow or holding account. Notably, this means such funds will not be available for immediate withdrawal and, in particular, may not be available until such a hold period has passed. Nevertheless, such a variation may reduce risk to the financial institution as compared to conventional deposit handling in that it may reduce the risk of a withdrawal from the drawer's account during the delay associated conventional deposit item handling making a deposit item NSF. Additionally or alternatively, such a variation may be employed for purposes of fraud reduction. For example, where fraud systems detect indicia of possible fraud or other risks to the bank (e.g., too high an amount), the funds may be held in an escrow account to allow for additional variation and/or for a period to allow any inconsistencies to be investigated and/or come to light. In a particular example, while funds may be nonetheless withdrawn from the drawer account in accordance with the method depicted in flowchart 500, that method may be varied by the addition of an operation of determining, for example based on one or more factors (e.g., related to indicia of possible fraud and/or risk), whether to release funds to the payee immediately (by way of a deposit into their account) or whether to hold some or all of the funds in escrow for a period, with the account into which a deposit is made (e.g., a deposit into an escrow account with a view to later transfer into an account into which the deposited item is being deposited vs. an immediate deposit into that) being determined based on the determination of whether to release the funds immediately or instead to hold them.

In a yet even further example of possible variations, it may be that at the operation 520 the institution on which the deposit item is drawn is determined based on data (e.g., MICR line characters) read magnetically from the deposit item in addition or as an alternative to based on analysis of the scanned image of the deposit item. For example, as mentioned above, a MICR reader may be employed to read the MICR line of a deposit item. Similarly, it may be that at the operation 550, the account number of the drawer is determined based on data read magnetically from the deposit item in addition or as an alternative to analysis of the scanned image thereof.

Referring again to FIG. 1, it is restated that the arrangement of FIG. 1 is merely by way of example and, indeed, is capable of variation without deviating from the subject matter of the present application. For example, the back-office server system 110 may include more than one computing device and/or may communicate with other computer servers in order to provide functionality such as, for example, functionality related to or a part of the subject matter of the present application.

Figure 8:
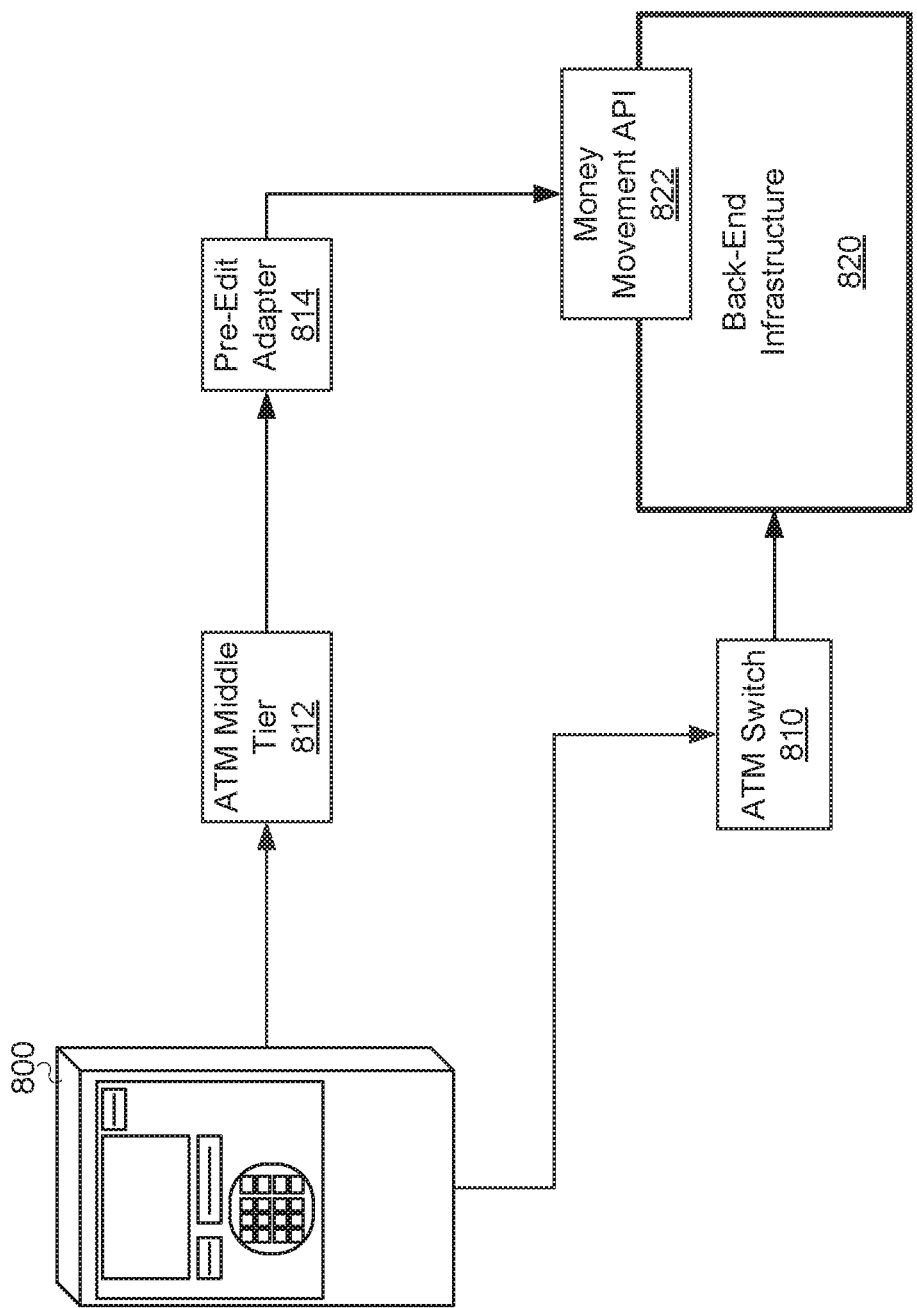
FIG. 8 is a schematic operation diagram illustrating an operating environment of an example embodiment.

FIG. 8 is a schematic operation diagram illustrating an operating environment of another example embodiment.

As illustrated, an automated teller machine 800 is in communication with an ATM switch 810 and an ATM middle tier 812. The ATM switch 810 is in communication with back-end infrastructure 820. The ATM middle tier 812 is in communication with a pre-edit adapter 814. The pre-edit adapter 814 is in communication with a money movement application programming interface (API) 822 of the back-end infrastructure 820.

The automated teller machine 800 is an automated teller machine 100 identical or similar to the automated teller machine 100 described above.

The ATM switch 810 and the ATM middle tier 812 are computer systems. For example, one or both of the ATM switch 810 and the ATM middle tier 812 may be a suitably configured instance of the example computing device 300.

The pre-edit adapter 814, the money movement API 822, and the back-end infrastructure 820 each represent services provided by computer systems. For example, such services may be provided by one or more suitably configured computer systems such as, for example, by one or more suitably configured instances of the example computing device 300.

Figure 9:
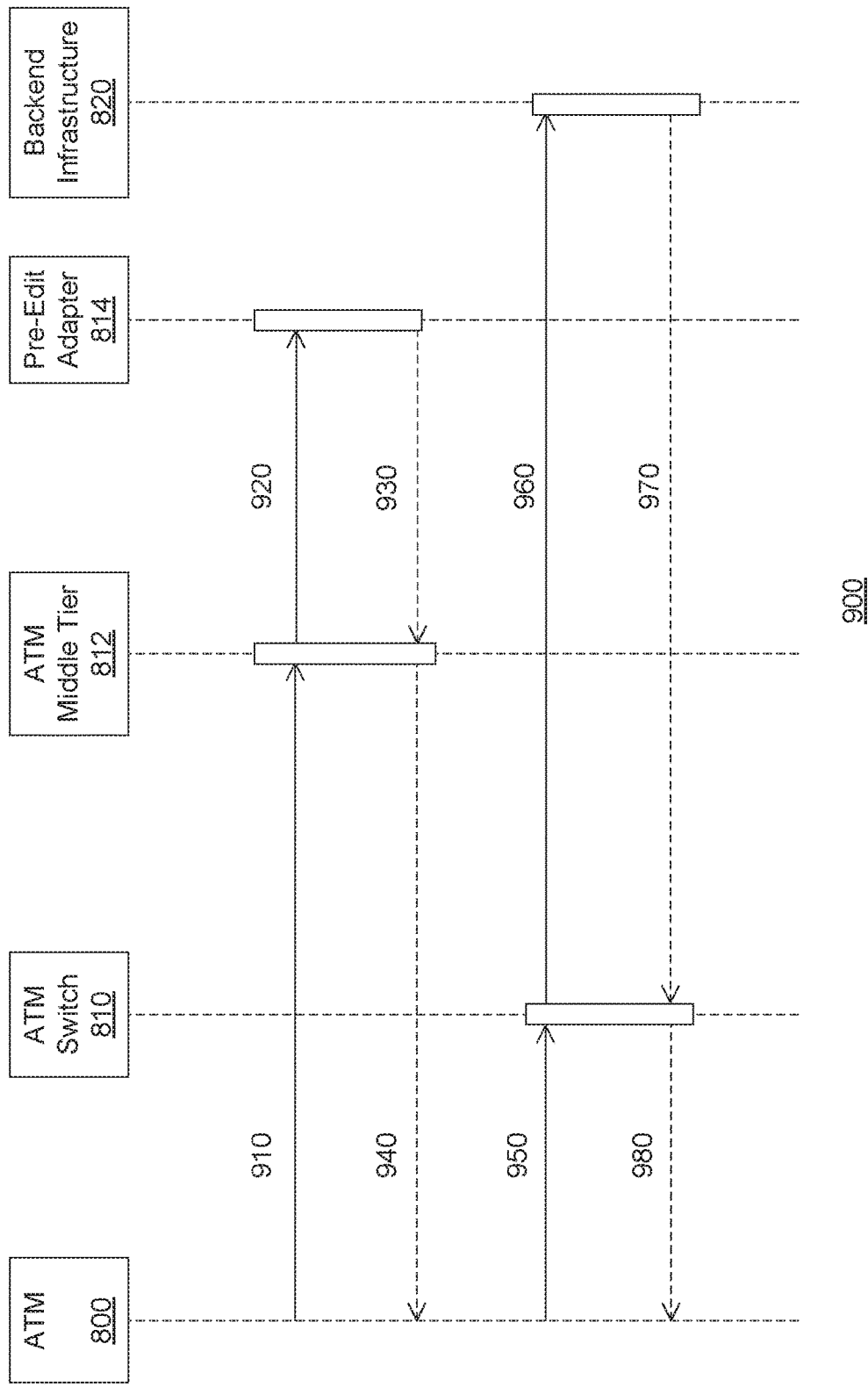
FIG. 9 is a sequence diagram depicting communications between computer systems during completion of a transfer of value, exemplary of the example embodiment of FIG. 8.

FIG. 9 illustrates a sequence diagram 900, similar to a Unified Modelling Language (UML) sequence diagram, that shows how automated teller machine 800, ATM switch 810, the ATM middle tier 812, the pre-edit adapter 814, and the back-end infrastructure 820 may communicate in some embodiments, and, in particular, depicting messages exchanged therebetween in automatically analyzing and processing, in real-time or near-real time, a deposit item received by the automated teller machine 800.

In the following description of the sequence diagram 900, discussion is made of various messages being sent and received via a computer network. In some embodiments, the exchanged messages may be implemented as messages. However, in other embodiments, some or all of the illustrated messages may not correspond to messages per se when sent over the computer network but may instead be implemented using techniques such as for example remote procedure call (RPC) and/or web services application programming interfaces (APIs). For example, it may be that the various message pairs illustrated in FIG. 9—e.g. messages 910 and 940—correspond, respectively, to an RPC or a web service API call and a reply or callback in response to that call.

Notably, the messages illustrated in the sequence diagram 900 may correspond to messages as may be exchanged in the architecture of FIG. 8 in carrying out a process for automatically analyzing and processing, in real-time or near-real time, a deposit item received by the automated teller machine 800. Such a method may correspond to the method depicted in the flowchart 500 (FIG. 5) or some variation thereof.

As illustrated, at the beginning of the sequence depicted in the sequence diagram 900, the automated teller machine 800 may send a message 910 to the ATM middle tier 812. Such a message may include information related to a deposit item such as may have been received and scanned by the automated teller machine 800 akin to the operation 510 (FIG. 5). It may be that the automated teller machine 800 sends the image of the scanned deposit item to the ATM middle tier 812 by way of the message 910. Additionally or alternatively, the automated teller machine may conduct an analysis of the deposit item such as, for example, to determine the drawee institution, drawer's account number and/or the amount of the deposit item. In such embodiments, the message 910 may include the results of such an analysis. In some embodiments, the automated teller machine 800 may perform a partial analysis and may send the results of that partial analysis to the ATM middle tier 812 by way of the message 910. For example, the automated teller machine 800 may extract the MICR line where the deposit item is a cheque and may send only that portion of the image of the scanned deposit item by way of the message 910.

Next, responsive to the message 910, the ATM middle tier 812 may send a message 920 to the pre-edit adapter 814. For example, it may be that the ATM middle tier 812 performs operations akin to one or more of the operations 510, 520, 530 and/or 550 (FIG. 5), with what operations are performed depending on factors such as, for example, the circumstances and, potentially, on what processing has already been performed by the automated teller machine 800, the operations resulting in one or more of identifying the deposit item as an "on us" deposit item, determining the drawer's account number and/or determining the amount of the deposit item. The message 920 may be sent responsive to such processing and may provide information stemming therefrom.

The pre-edit adapter 814 is responsible for performing staging operations for the transaction(s) related to handling the deposit item. Upon receiving the message 920, the pre-edit adapter 814 may take steps to verify that the transaction should move forward such as, for example, verifying available funds in the drawer's account—e.g., checking that the deposit item isn't NSF—and/or checking limits (for the user of the automated teller machine 800 and/or their account and/or other limits). Additionally or alternatively, the pre-edit adapter 814 may communicate with one or more fraud systems to determine whether the transaction has indicia of fraud sufficient that it should be denied or flagged.

In some embodiments, the pre-edit adapter 814 may, additionally or alternatively, take steps to place a hold on or otherwise encumber funds corresponding to the amount of the deposit item in the drawer's account, thereby performing operations akin to part of the operation 580 (FIG. 5). For example, the pre-edit adapter 814 may communicate with the back-end infrastructure 820. Conveniently, by encumbering the funds in the drawer's account, race conditions such as mentioned above may be avoided.

Following processing at the pre-edit adapter 814, a message 930 is sent by the pre-edit adapter 814 to the ATM middle tier 812. In some embodiments, the message 930 may be considered a reply to the message 920. The message 930 may indicate that one or more operations performed by and/or initiated by the pre-edit adapter 814 have been completed and/or initiated. For example, the message 930 may indicate that one or more of the possible operations highlighted above in the discussion of handling of the message 920 by the pre-edit adapter 814 have been completed and/or initiated.

Responsive to the message 930, a message 940 is sent by the ATM middle tier 812 to the automated teller machine 800. In some embodiments, the message 940 may be considered a reply to the message 910. The message 940 may indicate that one or more operations performed by and/or initiated by the ATM middle tier 812 have been completed and/or initiated. For example, the message 940 may indicate that one or more of the possible operations highlighted above in the discussion of handling of the message 910 by ATM middle tier (including, potentially, operations initiated by sending the message 920 to the pre-edit adapter 814) have been completed and/or initiated.

Responsive to the message 940, a message 950 is sent by the automated teller machine 800 to the ATM switch 810. The ATM switch 810 is responsible for completing and/or initiating completion of operations of transaction(s) related to handling of the deposit item. For example, the ATM switch 810 may initiate or perform operations related to crediting the payee's account in the amount of the deposit item and/or the encumbering of funds in the amount of the deposit item in the drawer's account. In a particular example, the ATM switch 810, may initiate a debit of the drawer's account in the amount of the deposit item, thereby removing from that account funds that may have been previously placed on hold by way of the pre-edit adapter 814. In summary, the ATM switch 810 may perform or initiate operations akin to the operation 580 (FIG. 5).

In performing or initiating operations, the ATM switch 810 may communicate with the back-end infrastructure 820. For example, the ATM switch 810 may send a message 960 to the back-end infrastructure 820 and/or may receive a message 970 from the back-end infrastructure 820. In some embodiments, the message 970 may be considered a reply to the message 960. In a particular example, the ATM switch 810 may communicate with the money movement API 822 of the back-end infrastructure 820 such as, for example, to effect credits, debits, and/or holds to funds in relevant accounts.

In some embodiments, the ATM switch 810 may communicate with and/or initiate communication with one or more fraud systems to determine whether the transaction has indicia of fraud sufficient that it should be denied or flagged.

Upon completing processing and/or initiating processing, the ATM switch 810 may send a message 980 to the automated teller machine 800. In some embodiments, the message 980 may be considered a reply to the message 950. Additionally or alternatively, it may be that the message 980 is sent responsive to the message 970.

The message 980 may act as an indication to the automated teller machine 800 that the payee's account has been credited in the amount of the deposit item. In other words, it may be considered an indication to the automated teller machine 800 that the amount of the deposit item is now available in the user's account. As discussed above, responsive to such an indication, the automated teller machine 800 may display a user interface indicating that the amount of the deposit item is now available in the account into which it was deposited. Conveniently, in this way, it may be recognized that funds flowing from deposit of the deposit item may, because it is an "on us" deposit item, be used for other purposes in a next transaction in the same session at the automated teller machine 800, without waiting.

Example embodiments of the present application are not limited to any particular operating system, system architecture, mobile device architecture, server architecture, or computer programming language.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

What is claimed is:

1. A computer system comprising:
   a processor;
   a communications module coupled to the processor; and
   a memory coupled to the processor storing instructions that, when executed by the processor, cause the computer system to:
      receive, using the communications module, an image of a deposit item scanned by an automated teller machine, the deposit item having been received by the automated teller machine in an automated teller machine session for deposit into a first account of a financial institution associated with the automated teller machine;
      analyze the scanned image of the deposit item to identify a drawee institution for the deposit item;
      determine that the drawee institution is the financial institution associated with the automated teller machine;
      analyze the scanned image of the deposit item to identify a drawer account on which the deposit item is drawn at the financial institution;
      confirm that the drawer account has sufficient available funds to cover an amount of the deposit item;
      upon confirming that the drawer account has sufficient funds to cover the amount of the deposit item, credit the first account in the amount of the deposit item without placing a hold on any of the credited amount and encumber funds of the drawer account in the amount of the deposit item, the encumbrance being performed after and in response to receiving the image of the deposit item, the deposit item having been received by the automated teller machine for deposit; and
      after crediting the first account in the amount of the deposit item, send an indication to the automated teller machine in the automated teller machine session that the amount of the deposit item is now available in the first account.

2. The system of claim 1, wherein the automated teller machine is configured to display a user interface indicating that the amount of the deposit item is now available in the first account responsive to the indication.

3. The system of claim 1, wherein the instructions, when executed by the processor, further cause the computer system to:
   receive, using the communications module, an image of a second deposit item scanned by the automated teller machine, the second deposit item having been received by the automated teller machine for deposit into the first account;
   analyze the scanned image of the second deposit item to identify a drawee institution for the second deposit item;
   determine that the drawee institution for the second deposit item is the financial institution associated with the automated teller machine;
   analyze the scanned image of the second deposit item to identify a drawer account on which the second deposit item is drawn at the financial institution;

confirm that the drawer account on which the second deposit item is drawn does not have sufficient available funds to cover an amount of the second deposit item;

upon confirming that the drawer account on which the second deposit item is drawn does not have sufficient funds to cover the amount of the second deposit item, credit the first account in the amount of the second deposit item and place a hold on funds in the first account in the amount of the second deposit item; and send an indication to the automated teller machine that the amount of the second deposit item is not yet available in the first account.

4. The system of claim 1 wherein the deposit item includes a line of magnetic ink character recognition (MICR) characters, and wherein analyzing the scanned image of the deposit item to identify the drawee institution includes:

using optical character recognition to recognize characters of at least a portion of the MICR line; and identifying the drawee institution based on the recognized characters.

5. The system of claim 4, wherein analyzing the scanned image of the deposit item to identify the drawer account on which the deposit item is drawn at the financial institution includes:

identifying the drawer account based on the recognized characters.

6. The system of claim 1, wherein the instructions, when executed by the processor, further cause the computer system to, prior to confirming that the drawer account has sufficient available funds to cover an amount of the deposit item, determine that the amount of the deposit item is less than a limit.

7. The system of claim 6, wherein the instructions, when executed by the processor, further cause the computer system to determine the limit based on the first account.

8. A computer-implemented method comprising:

receiving an image of a deposit item scanned by an automated teller machine, the deposit item having been received by the automated teller machine in an automated teller machine session for deposit into a first account of a financial institution associated with the automated teller machine;

analyzing the scanned image of the deposit item to identify a drawee institution for the deposit item;

determining that the drawee institution is the financial institution associated with the automated teller machine;

analyzing the scanned image of the deposit item to identify a drawer account on which the deposit item is drawn at the financial institution;

confirming that the drawer account has sufficient available funds to cover an amount of the deposit item; and upon confirming that the drawer account has sufficient funds to cover the amount of the deposit item, crediting the first account in the amount of the deposit item without placing a hold on any of funds in the first account and encumbering funds of the drawer account in the amount of the deposit item, the encumbrance being performed after and in response to receiving the image of the deposit item, the deposit item having been received by the automated teller machine for deposit; and after crediting the first account in the amount of the deposit item, sending an indication to the automated teller machine in the automated teller machine session that the amount of the deposit item is now available in the first account.

9. The method of claim 8, wherein the automated teller machine is configured to display a user interface indicating that the amount of the deposit item is now available in the first account responsive to the indication.

10. The method of claim 8, further comprising:

receiving an image of a second deposit item scanned by the automated teller machine, the second deposit item having been received by the automated teller machine for deposit into the first account;

analyzing the scanned image of the second deposit item to identify a drawee institution for the second deposit item;

determining that the drawee institution for the second deposit item is the financial institution associated with the automated teller machine;

analyzing the scanned image of the second deposit item to identify a drawer account on which the second deposit item is drawn at the financial institution;

confirming that the drawer account on which the second deposit item is drawn does not have sufficient available funds to cover an amount of the second deposit item;

upon confirming that the drawer account on which the second deposit item is drawn does not have sufficient funds to cover the amount of the second deposit item, crediting the first account in the amount of the second deposit item and placing a hold on funds in the first account in the amount of the second deposit item; and sending an indication to the automated teller machine that the amount of the second deposit item is not yet available in the first account.

11. The method of claim 8, wherein the deposit item includes a line of magnetic ink character recognition (MICR) characters, and wherein analyzing the scanned image of the deposit item to identify the drawee institution includes:

using optical character recognition to recognize characters of at least a portion of the MICR line; and identifying the drawee institution based on the recognized characters.

12. The method of claim 11, wherein analyzing the scanned image of the deposit item to identify the drawer account on which the deposit item is drawn at the financial institution includes:

identifying the drawer account based on the recognized characters.

13. The method of claim 8, further comprising:

prior to confirming that the drawer account has sufficient available funds to cover an amount of the deposit item, determining that the amount of the deposit item is less than a limit.

14. The method of claim 13 wherein the limit is determined based on the first account.

15. A non-transitory computer-readable storage medium storing instructions that, when executed by a processor of a computer system cause the computer system to:

receive an image of a deposit item scanned by an automated teller machine, the deposit item having been received by the automated teller machine in an automated teller machine session for deposit into a first account of a financial institution associated with the automated teller machine;

analyze the scanned image of the deposit item to identify a drawee institution for the deposit item;

determine that the drawee institution is the financial institution associated with the automated teller machine;

analyze the scanned image of the deposit item to identify a drawer account on which the deposit item is drawn at the financial institution;

confirm that the drawer account has sufficient available funds to cover an amount of the deposit item;

upon confirming that the drawer account has sufficient funds to cover the amount of the deposit item, credit the first account in the amount of the deposit item without placing a hold on any of the credited amount and encumber the drawer account in the amount of the deposit item, the encumber being performed after and in response to receiving the image of the deposit item, the deposit item having been received by the automated teller machine for deposit; and after crediting the first account in the amount of the deposit item, send an indication to the automated teller machine in the automated teller machine session that the amount of the deposit item is now available in the first account.

16. The computer-readable medium of claim 15, wherein the automated teller machine is configured to display a user interface indicating that the amount of the deposit item is now available in the first account responsive to the indication.

17. The computer-readable medium of claim 15, wherein the deposit item includes a line of magnetic ink character recognition (MICR) characters, and wherein analyzing the scanned image of the deposit item to identify the drawee institution includes:

using optical character recognition to recognize characters of at least a portion of the MICR line; and identifying the drawee institution based on the recognized characters.

18. The computer-readable medium of claim 17, wherein analyzing the scanned image of the deposit item to identify the drawer account on which the deposit item is drawn at the financial institution includes:

identifying the drawer account based on the recognized characters.

19. The computer-readable medium of claim 15, wherein the instructions, when executed by further cause the computer system to, prior to confirming that the drawer account has sufficient available funds to cover an amount of the deposit item, determine that the amount of the deposit item is less than a limit.

20. The computer-readable medium of claim 19 wherein the limit is determined based on the first account.

* * * * *